US009361593B2

(12) United States Patent
Ambrose et al.

(10) Patent No.: US 9,361,593 B2
(45) Date of Patent: Jun. 7, 2016

(54) SYSTEM AND METHOD FOR USING BUSINESS SERVICES

(75) Inventors: Jesse Ambrose, San Jose, CA (US); Mark Curtis Hastings, Palo Alto, CA (US); Atul Suklikar, San Carlos, CA (US)

(73) Assignee: Oracle America, Inc., Redwood Shores, CA (US)

( * ) Notice: Subject to any disclaimer, the term of this patent is extended or adjusted under 35 U.S.C. 154(b) by 3079 days.

(21) Appl. No.: 10/170,211

(22) Filed: Jun. 13, 2002

(65) Prior Publication Data

US 2007/0208605 A1     Sep. 6, 2007

Related U.S. Application Data

(63) Continuation of application No. 10/112,055, filed on Apr. 1, 2002, now abandoned.

(60) Provisional application No. 60/280,141, filed on Apr. 2, 2001, provisional application No. 60/279,693, filed on Mar. 30, 2001.

(51) Int. Cl.
| | | |
|---|---|---|
| *G06Q 30/02* | (2012.01) | |
| *G06Q 10/10* | (2012.01) | |
| *G06Q 10/06* | (2012.01) | |
| *G06Q 30/06* | (2012.01) | |
| *G06Q 10/08* | (2012.01) | |
| *G06Q 10/00* | (2012.01) | |
| *G06Q 30/00* | (2012.01) | |

(52) U.S. Cl.
CPC .............. *G06Q 10/00* (2013.01); *G06Q 30/016* (2013.01); *G06Q 30/02* (2013.01)

(58) Field of Classification Search
CPC ..................................................... G06Q 30/016
USPC ........................................... 705/1.1–912, 304
See application file for complete search history.

(56) References Cited

U.S. PATENT DOCUMENTS

| | | | | |
|---|---|---|---|---|
| 5,303,379 | A | * | 4/1994 | Khoyi et al. .................. 717/166 |
| 5,452,299 | A | * | 9/1995 | Thessin et al. ................ 370/260 |
| 5,710,920 | A | * | 1/1998 | Maruyama et al. ........ 707/103 R |
| 5,794,001 | A | * | 8/1998 | Malone et al. ................ 715/762 |
| 5,881,230 | A | * | 3/1999 | Christensen et al. ......... 709/203 |
| 5,900,870 | A | * | 5/1999 | Malone et al. ................ 715/866 |
| 5,956,736 | A | * | 9/1999 | Hanson et al. ................ 715/234 |
| 6,145,096 | A | * | 11/2000 | Bereiter et al. ................. 714/25 |
| 6,317,718 | B1 | * | 11/2001 | Fano .......................... 705/14.39 |

(Continued)

OTHER PUBLICATIONS

Business Editors & High Tech Writers. (Oct. 12). EnterpriseLink Delivers Enhanced Version of Application Integration Software with "Extension Capabilities". Business Wire,1.*

(Continued)

*Primary Examiner* — Jonathan Ouellette

(57) ABSTRACT

A system and method for using business services within a customer relationship management (CRM) application. Business services are objects that encapsulate and simplify the use of some set of functionality. The CRM application includes an object manager that manages business objects as well as business services. Business objects are associated with data stored in the application database. Business services operate or act upon business objects to achieve a particular goal. Business services include methods that can be invoked and properties that maintain information about the state of a process during execution.

36 Claims, 12 Drawing Sheets

(56) References Cited

U.S. PATENT DOCUMENTS

| | | |
|---|---|---|
| 6,377,944 B1 * | 4/2002 | Busey et al. |
| 6,820,267 B2 * | 11/2004 | Christensen et al. ......... 719/315 |
| 7,505,577 B2 * | 3/2009 | Annadata et al. ........ 379/265.09 |
| 2002/0082892 A1 * | 6/2002 | Raffel et al. ...................... 705/8 |
| 2002/0161778 A1 * | 10/2002 | Linstedt ........................ 707/102 |
| 2002/0191035 A1 * | 12/2002 | Selent ............................ 345/866 |
| 2002/0199035 A1 * | 12/2002 | Christensen et al. ......... 709/330 |
| 2002/0199182 A1 * | 12/2002 | Whitehead ........................ 725/1 |
| 2003/0051226 A1 * | 3/2003 | Zimmer et al. ............... 717/102 |
| 2003/0115377 A1 * | 6/2003 | Curtis et al. .................. 709/328 |
| 2003/0236925 A1 * | 12/2003 | Balek et al. .................. 709/328 |
| 2004/0093397 A1 * | 5/2004 | Chiroglazov et al. ......... 709/219 |
| 2004/0143470 A1 * | 7/2004 | Myrick et al. .................... 705/7 |
| 2007/0208605 A1 * | 9/2007 | Ambrose et al. .................. 705/9 |

OTHER PUBLICATIONS

Business Editors/High-Tech Writers. (Jul. 15). ICL Standardizes on Siebel Systems' Web-Based Front Office Applications to Heighten Sales and Increase Customer Loyalty. Business Wire,1.*

Business Editors and Computer Writers. (May 4). Motorola Selects Siebel Software to Implement New Sales Support System; Siebel Enterprise Relationship Management System Will Improve Sales and Service Efficiency. Business Wire,1.*

60280141 specifiation.*

* cited by examiner

1000

Business Service Summary  —  SIEBEL

| | | | | | |
|---|---|---|---|---|---|
| Created By | SADMIN | Updated By: | SADMIN | Active | 4 |
| Created | 06/20/99 | Updated: | 06/26/99 | Unsaved Changes | 4 |
| Description | A set of routines that compute the risk associated with a given policy. It utilizes an external calculation engine via COM. | | | | |

| Name | Type | Description |
|---|---|---|
| Age | Integer | The Age of the Policy Holder |
| Policy BC | BusComp | The Policy Business Component Instance. |

BetaCalculation

| Type | Function | Return Type | Double | Active | 4 |
|---|---|---|---|---|---|
| Description | Computes the Risk (Beta) using an external (proprietary) calculation engine. | | | | |

| Name | Type | Required | Description |
|---|---|---|---|
| PolicyNum | String | 4 | Policy Number |

CalculateAge

| Type | Function | Return Type | Integer | Active | 4 |
|---|---|---|---|---|---|
| Description | Calculates the age of a person in years, given his date of birth. | | | | |

| Name | Type | Required | Description |
|---|---|---|---|
| PolicyNum | String | 4 | Policy Number |

Start

| Type | Procedure | Return Type | | Active | 4 |
|---|---|---|---|---|---|
| Description | Initializes the Business Service | | | | |

SIEBEL    Report generated for SADMIN on 06/29/99    Page 1 of 5

Business Service Detail — SIEBEL

| Created By | SADMIN | Updated By: | SADMIN | Active | 4 |
| --- | --- | --- | --- | --- | --- |
| Created | 06/20/99 | Updated: | 06/26/99 | Unsaved Changes | 4 |
| Description | \multicolumn{5}{l}{A set of routines that compute the risk associated with a given policy. It utilizes an external calculation engine via COM.} |

| Name | Type | Description |
| --- | --- | --- |
| Age | Integer | The Age of the Policy Holder |
| Policy BC | BusComp | The Policy Business Component Instance |

BetaCalculation

| Type | Function | Return Type | Double | Active | 4 |
| --- | --- | --- | --- | --- | --- |
| Description | \multicolumn{5}{l}{Computes the Risk (Beta) using an external (proprietary) calculation engine.} |

| Name | Type | Required | Description |
| --- | --- | --- | --- |
| PolicyNum | String | 4 | Policy Number |

```
Function BetaCalculation (PolicyNum As String) As Double
Dim CalcEngine As Object Set CalcEngine = CreateObject ("CalculationEngine.calculation")

PolicyBC.ClearToQuery
PolicyBC.SetSearchSpec "Policy Number", PolicyNum
PolicyBC.ExecuteQuery BirthDate = PolicyBC.GetFieldValue ("Birth Date")
Income = PolicyBC.GetFieldValue ("Income")
Smoker = PolicyBC.GetFieldValue ("Smoker")

Age = me.CalculateAge (BirthDate)

BetaCalculation = CalcEngine.CalculateBeta (Age, Income, Smoker)

End Function
```

SIEBEL    Report generated for SADMIN on 06/29/99    Page 1 of 10

FIG. 11

SYSTEM AND METHOD FOR USING BUSINESS SERVICES

CROSS-REFERENCE TO RELATED APPLICATIONS

This application is a continuation of co-pending U.S. patent application Ser. No. 10/112,055, entitled "System and Method for Using Business Services," filed on Apr. 1, 2002, which claims priority to U.S. patent application Ser. Nos. 60/279,693, entitled "Business Services," filed on Mar. 30, 2001, and 60/280,141, also entitled "Business Services," filed on Apr. 2, 2001. The entirety of each of these applications is incorporated herein by reference.

BACKGROUND

1. Field of the Invention

The present invention relates generally to the field of data processing. More specifically, the present invention relates to techniques for using business services within a customer relationship management software environment.

2. Discussion of the Related Art

As technology continues to advance and the business environments have become increasingly complex and diverse, more and more companies have relied on various customer relationship management (CRM) software and eBusiness applications to conduct and manage various aspects of their enterprise business. In general, eBusiness applications are designed to enable a company or enterprise to conduct its business over an interactive network (e.g., Internet, Intranet, Extranet, etc.) with its customers, partners, suppliers, distributors, employees, etc. eBusiness applications may include core business processes, supply chain, back-office operations, and CRM functions. CRM generally includes various aspects of interaction a company has with its customers, relating to sales and/or services. At a high level, CRM is focused on understanding the customer's needs and leveraging this knowledge to increase sales and improve service. CRM techniques and software are generally designed to provide effective and efficient interactions between sales and service, and to unify a company's activities around the customer in order to increase customer share and customer retention through customer satisfaction.

Typically, CRM implementation strategy needs to consider the following:

Knowledge Management: one of the important factors of an effective CRM implementation is the acquisition of information about a customer, its analysis, sharing and tracking. Also integral to the use of knowledge for competitive advantage is for employees to know what actions to take as a result of this knowledge.

Database Consolidation: another important aspect of an effective and efficient CRM solution is the consolidation of customer information in a single database and the re-engineering of business processes around the customer. The goal here is to have all interactions with a customer recorded in one place to drive production, marketing, sales and customer support activities.

Integration of Channels and Systems: it is very important for a CRM application/software to provide the capability to respond to customers in a consistent and high-quality manner through their channel of choice, whether that is e-mail, phone, web-based user interfaces, etc. This may require the seamless integration of various communication channels with the customer or enterprise database. It also may require the integration of CRM with other parts of a company's business systems and applications.

Technology and Infrastructure: to enhance customer services, a CRM application/software may include various tools to automate and streamline online customer service. For example, a self-help model typically can be implemented using a combination of tools (e.g., knowledge bases with an intuitive search capability, agent technology, automated email).

What is needed is an improved CRM application having objects that encapsulate and simplify the use of some set of functionality. For example, these service objects could be used to accomplish a variety of tasks, such as performing specialized calculations, transforming data between formats, and accessing data external to the CRM application.

BRIEF DESCRIPTION OF THE DRAWINGS

The present invention is described with reference to the accompanying drawings.

FIG. 10 depicts an example business service summary report.

FIG. 11 depicts an example business service detail report that includes detail information about the business services in the current query.

DETAILED DESCRIPTION

Techniques according to the present invention are described herein for using business services within a CRM application. This is accomplished by providing business services within the application object manager that represent an encapsulation of some set of functionality. Business services can include methods and properties, and can be invoked by other objects managed by the object manager. These techniques are described in greater detail below.

In the following detailed description numerous specific details are set forth in order to provide a thorough understanding of the present invention. However, it will be appreciated by one skilled in the art that the present invention may be understood and practiced without these specific details. For example, the present invention includes one or more computer programs which embody the functions described herein and illustrated in the appended flowcharts. It should be apparent that there could be many different ways of implementing the invention in computer programming, and the invention should not be construed as limited to any one set of computer program instructions. Further, a skilled programmer would be able to write such a computer program to implement the disclosed invention without difficulty based on the flowcharts and associated written description included herein. Therefore, disclosure of a particular set of program code instructions is not considered necessary for an adequate understanding of how to make and use the invention. The inventive functionality of the claimed computer program will be explained in more detail in the following description in conjunction with the remaining figures illustrating the program flow.

System Overview and Overall Architecture

Figure 1:
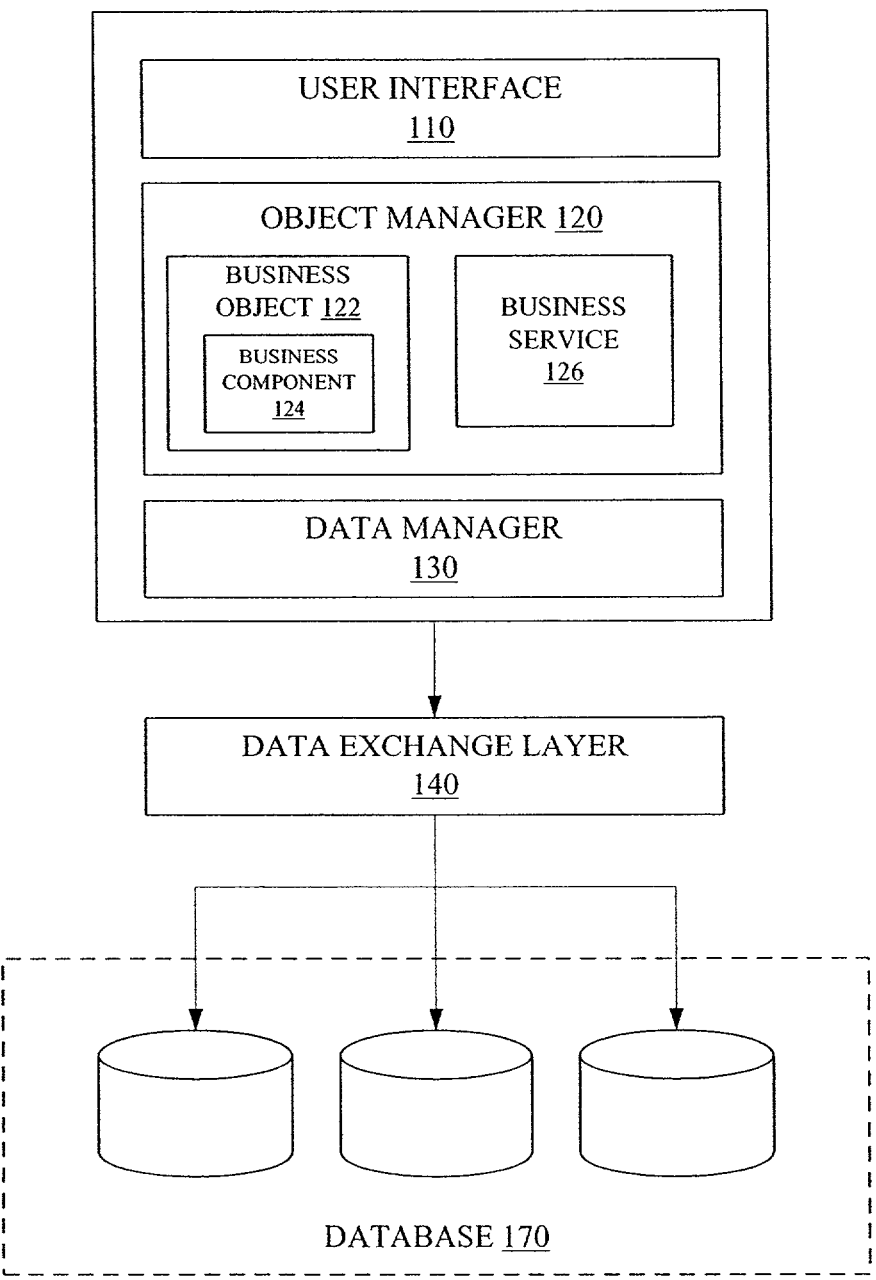
FIG. 1 shows a multi-layered system architecture in which the teachings of the present invention are implemented.

A system in which the teachings of the present invention are implemented can be logically structured as a multi-layered CRM architecture as shown in FIG. 1. A logical multi-layered architecture 100 provides a platform for common services to support the various applications. These services can include a user interface layer 110, an object manager layer 120, a data manager layer 130, and a data exchange layer 140.

User interface layer 110 provides the applets, views, charts and reports, etc. associated with one or more applications. Various types of clients can be supported via user interface layer 110. These various types of clients may include traditional connected clients, remote clients, thin clients over an intranet, Java thin clients or non-Windows-based operating systems, and HTML clients over the Internet, etc.

Object manager layer 120 is designed to manage one or more sets of business rules or business concepts associated with one or more applications and to provide the interface between user interface layer 110 and data manager layer 130. Object manager layer 120 manages various types of objects, such as business objects 122 and business services 126.

Business objects 122 can be used to represent business rules or concepts. In one embodiment, business objects can be designed as configurable software representations of the various business rules or concepts such as accounts, contacts, opportunities, service requests, solutions, etc. Business objects 122 can include one or more business components 124. Business components 124 represent encapsulations of data from a data source, such as database 170 or an external data source.

Business services 126 are objects that encapsulate and simplify the use of some set of functionality. Whereas business components 124 and business objects 122 are typically tied to specific data and tables, business services 126 on the other hand are not tied to specific objects, but rather operate or act upon objects to achieve a particular goal. For example, business services 126 can simplify the task of moving data and converting data formats between the CRM application and external applications. Business services 126 can also be used to accomplish other types of tasks, such as performing a standard tax calculation, shipping rate calculation, or other specialized functions. Business services 126 are described in greater detail below.

Data manager layer 130 maintains logical views of the underlying data and allows object manager layer 120 to function independently of underlying data structures or tables in which data is stored. Data manager layer 130 may also provide certain database query functions such as generation of structure query language (SQL) in real time to access data stored in database 170. Data manager layer 130 operates on object definitions in a repository file (not shown) that define the database schema. Data exchange layer 140 handles the interactions with one or more specific target databases within database 170 and provides the interface between data manager layer 130 and the underlying data sources.

Database 170 provides the data storage for the data model associated with one or more applications. In one embodiment, database 170 stores various types of data including predefined data schema (e.g., table objects, index objects, etc.), repository objects (e.g., business objects and components, view definitions and visibility rules, etc.), and user's or customer's data. Mobile web clients can download a subset of the server's data to use locally, and periodically synchronize with the server database through the system server to update both the local and the server database.

Overview of Business Services

Business services 126 include methods that can be invoked and properties that maintain information about the state of a process during execution. Business services 126 can provide methods that, for example, provide access to external data or to business objects and business components. A business service has properties and methods and maintains a state. Methods take arguments that can be passed into the object programmatically or, in the case of Siebel EAI, declaratively by way of workflows.

Methods can be defined using a scripting language or a programming language, such as C++, and can be invoked from any other script (including other business service methods). Business services 126 can be internal or external. Internal business services are defined in a repository (not shown) within the CRM application. Internal business services are compiled and distributed to end-users. External business services are defined in database 170, and are distributed to disconnected users through synchronization methods. A business service instance is used herein to refer to a running instance of a business service 126. In order to access a business service method or property, a handle to a running instance is obtained. Both internal and external business services can be executed from other business services.

One example of a business service 126 is a "Life Insurance Policy Compliance" service. This example business service 126 includes methods that define the various rules in the compliance process. These methods stipulate the conditions that must be met and actions that should be taken in response to a condition being met. Methods are defined using the same language that is used for scripting applications. This offers the full power of a complete procedural language to model complex business logic. This allows methods to, for example, perform complex calculations, perform branching logic, launch external programs, and to call business components 124, applets, application methods, and external applications and functions. In one embodiment, Visual Basic is the supported scripting language for a Windows platform. In another embodiment, business services 126 can be implemented using C++.

Methods within business service 126 can be invoked from any script associated with the CRM application including: application scripts, business component scripts, applet scripts, control scripts, SmartScript logic, product configurator scripts, and business service methods. Business service methods can also be invoked from an external application via a standard object interface such as Component Object Model (COM) or Common Object Request Broker Architecture (CORBA). Commonly used functions can thus be defined as business service methods and reused from multiple scripts. This also enables chaining business service methods together to form compound business service methods.

An application developer can create an internal business service using the appropriate tools within user interface 110. This is particularly useful where the business service is not frequently modified, or where security is an issue since internal methods cannot be inspected or modified by an application administrator. Updates to internal business services are compiled and distributed to end-users by the CRM application.

Alternatively, an administrator can create an external business service using the application client. This is particularly useful where the business services needs to be frequently updated. The normal synchronization mechanism provided by the CRM application can be used to efficiently propagate these updates to remote end-users.

Business Service Definition

In one embodiment, internal and external business services have similar definitions. The definition of an internal business services can include, for example, a name, type, class, description, active/inactive, property, method, and argument. The name should be a unique name among internal business services. The type can be "custom" or "built-in". A custom business service is defined using a scripting language, whereas a built-in business service is defined internally using C++. The class refers to the C++ class that defines the behavior of the business service. This attribute applies only to "built-in" business services. The description refers to a textual description of the purpose and behavior of the business service. The active/inactive attribute refers to a Boolean attribute that specifies whether the business process is inactive or active.

The property attribute is a child object of the business service whose definition can include, for example, a name, description, active/inactive, and data type. The name should be unique within the scope of the business service. The description refers to a brief description of the property. The active/inactive attribute is a Boolean attribute that specifies whether the business process is inactive or active. The data type for a property is a bounded pick list of the available return types, such as integer, string, float, double, date, Boolean, business component, business object, applet, application, control, SmartScript page.

The method attribute is also a child object of the business service whose definition can include, for example, a name, description, active/inactive, type, return type, script, program language, and arguments. The name should be unique within the scope of the business process. For custom business processes, the name is derived by parsing the signature of the method definition and updated whenever the script is updated and compiled. The description is a brief description of the method. The active/inactive attribute is a Boolean attribute that specifies whether the business process is inactive or active. The type indicates whether the method is a function or procedure. The return type indicates the data type for the return value. The data type can be selected from a bounded pick list of the available return types, such as integer, string, float, double, date, Boolean, business component, business object, applet, application, control, SmartScript page. The script refers to the actual script that defines the method, and applies only to custom business services. The program language is the language in which the script is defined. In one embodiment, the choices can be restricted to the supported scripting languages. This value is read from the current language setting and not modified explicitly by the user.

An argument attribute is a child object of the method whose definition can include, for example, a name, sequence, data type, required field, and description. For custom business services, these can be filled in automatically by parsing the signature of the method when it is compiled. The name refers to the name of the argument. The sequence refers to the sequence number among the list of arguments for this method. The data type is the data type of the argument. The required field is a Boolean attribute that specifies whether the argument is a required argument. The description is a brief description of the argument.

An external business service can be defined in a fashion similar to the internal business service. In one embodiment, the main difference between the definitions of an internal and external business service is that external services can only be defined using a scripting language. In other words, built-in external business services are not supported. Another difference is that external business services can include an additional field, an unsaved changes field that specifies whether there are changes to the business service methods or properties that need to be saved.

Executing a Business Service

A business service instance is accessed by calling an appropriate application and specifying the business service name as the argument. In one embodiment, there can be only one instance of a given business service running at any given time. For example, business service instances can be accessed via the COM and CORBA interfaces as well as via visual basic and JavaScript.

In one embodiment, several actions can occur when a business service instance is accessed. If an instance of the business service has already been created, a handle to the business service instance is returned. If an instance of the business service does not exist, a business service of the specified name is searched for first among the list of external business services. If an external business service of that name is not found, the list of internal business services is searched.

If the business service of that name is found, a business service instance is created. The creation of a business service instance causes all the state variables to be initialized. After the state variables have been initialized, a "start" Method, if defined, is invoked. Once the instance is created, a handle to the business service is returned.

In one embodiment, a business service instance can be destroyed by calling an appropriate method. If a "finish" method has been defined for the business service, it is invoked before the business service instance is destroyed.

Business service methods can be invoked in various ways. From another method in the same business service, a business service method is invoked by simply calling the function or procedure by name and specifying the required arguments. From outside the business service, a business service method is invoked using an appropriate call.

Business service methods can be invoked directly, where the method includes arguments such as a name, an array of variants, and a return value. The method name refers to the name of the method to be invoked. The array of variants refers to an array of arguments to be passed to the method. In one embodiment, the array does not have a fixed length and is constructed before the method is invoked. The return value of the method is passed back through this argument (if the method is a function).

A business service property can be accessed in various ways. From a business service method, a business service property is accessed simply by name as if it were a variable defined in the scope of the business service. The value of the property can be modified by simply assigning the desired value to the property. From outside the business service, the value of a property can be obtained and modified by appropriate calls. Calls to access business service properties can be called via COM and CORBA interfaces as well as via visual basic and Siebel JavaScript.

Exporting and Importing Business Services

In one embodiment, a business service can be exported from the CRM application to an external file. When a business service is exported, all its constituent methods and properties are also exported.

Business services can also be imported into the CRM application. For example, the contents of an archive file created by exporting a business service (or processes) can be imported. Standard capabilities within the CRM application for importing objects can be used to import the contents of the archive file. When the contents of an archive file are imported into the client, conflict resolution is performed automatically as follows. If a business service definition exists in both the archive file as well as the client database, the definition in the client is overwritten, i.e., the client definition is deleted and replaced with the one from the archive file.

User Interface

In one embodiment, user interface 10 provides various utilities for handling business services 126. New business services 126 can be created and edited using an object explorer and an object list editor.

Figure 2:
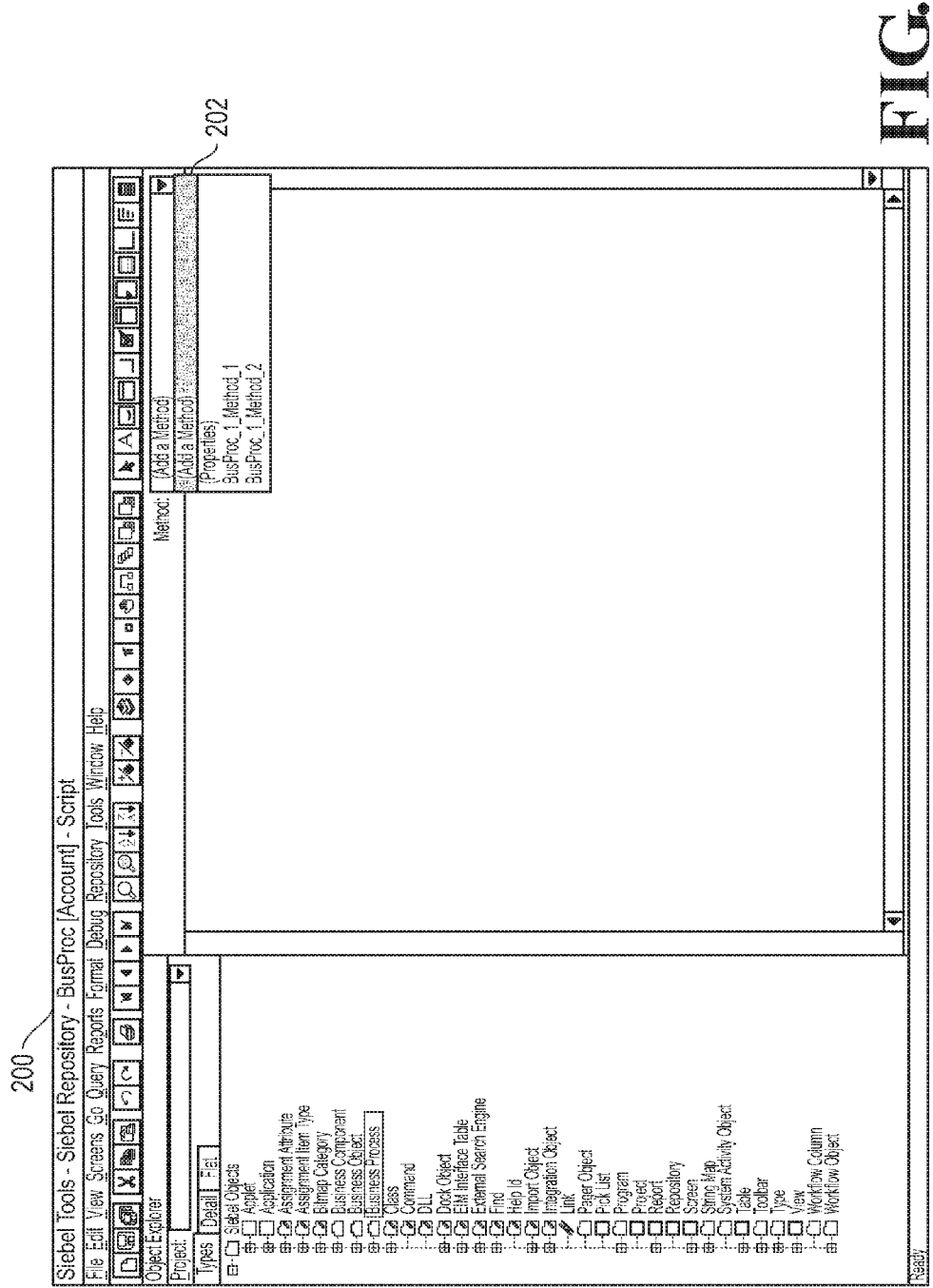
FIG. 2 depicts an example script editor within the user interface according to one example embodiment of the present invention

For example, to add a method to a business service, the user selects a business service and the selects "Edit Scripts" or something similar. This brings up the script editor. FIG. 2 depicts an example script editor 200 within user interface 110 according to one example embodiment of the present invention. The script editor has one combo-box active, the method combo-box 202. The choices in method combo-box 202 are: "Add a Method", "Properties", and the various methods for that business service listed in alphabetical order. When script editor 200 is brought up, the first method is selected. If there is no method defined for this business service, then the "Add a Method" choice is automatically selected.

Figure 3:
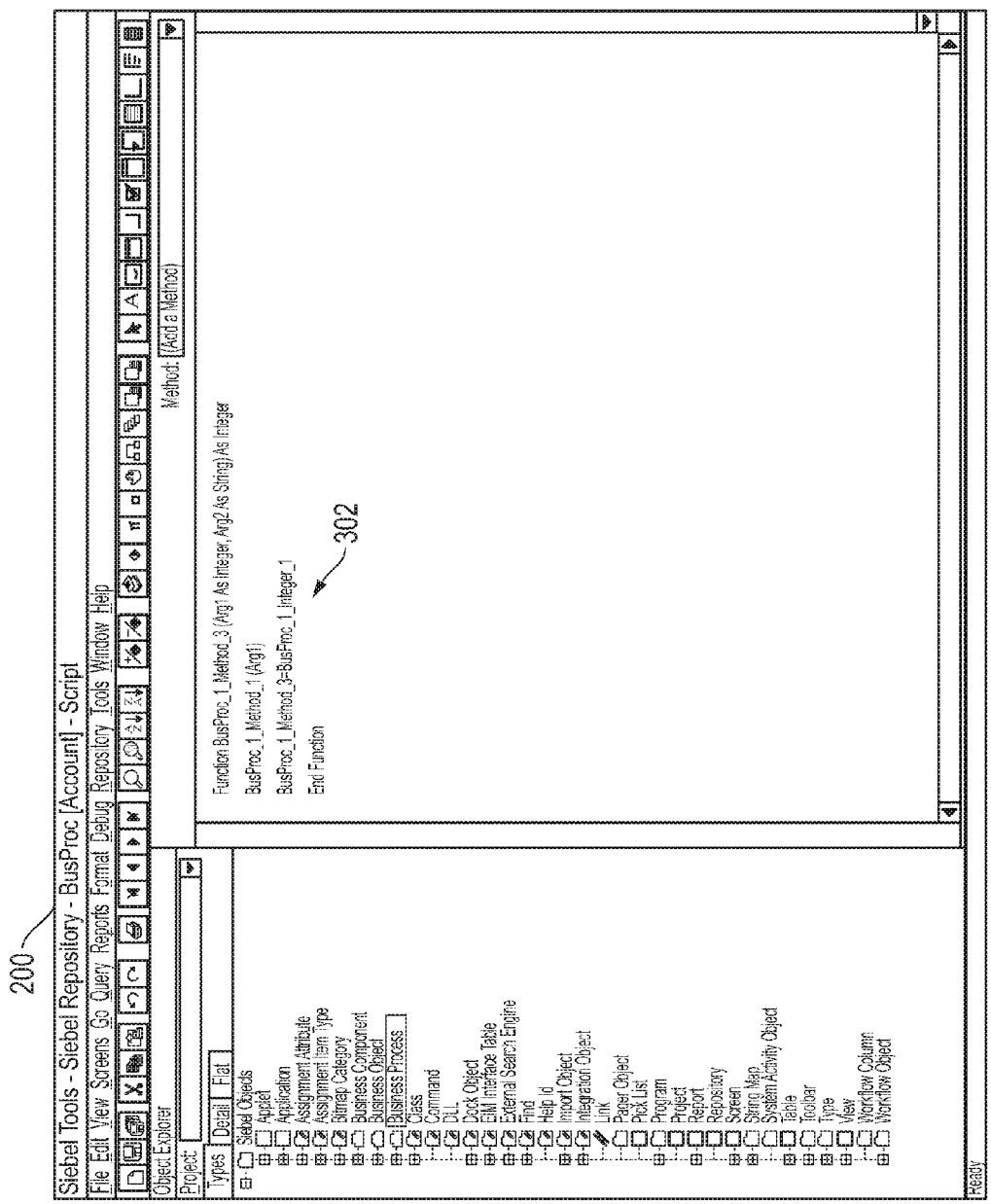
FIG. 3 depicts an example method (BusProc_1_Method_3) within the script editor.

To create a new method, the user selects "Add a Method" in the Method combo-box (if it has not already been selected). The user then types the code for a method which, in one embodiment, must be a function or sub-procedure. FIG. 3 depicts an example method 302 (BusProc_1_Method_3) in script editor 200. When the code is complete and saved, a new method record is created in the repository for that business service. The name, type, return type, and argument are automatically updated. The developer can edit the description attribute of the method object, and the description and required attributes of the argument objects.

To edit an existing business service method, the user selects a business service method and selects "Edit Scripts". This brings up script editor 200 with the appropriate method selected in method combo-box 202. The user then edits the code and saves any changes. If the signature of the method is updated, these changes are reflected in the repository definition of the method.

To create/edit a business service property, the user selects the business service and select "Edit Scripts". This brings up script editor 200. In methods combo-box 202, the user selects "Properties". The contents of the script editor window lists all the properties defined for this business service. A new property can be created or an existing property may be modified. When the changes are saved, the property records in the repository are updated. The name and data type attributes are automatically updated based on the information in the script editor. The user can manually update the description attribute.

Configuring External Business Services

In one embodiment, user interface 110 includes a business service screen that includes a details view, a scripts view, a methods view, and a properties view. The business service screen is available to administrators for the purposes of creating and managing business services. The details view displays information about the business service, properties, methods, and method arguments. The scripts view displays information about the business service, properties, methods, as well as a script editor to view and edit business service methods and properties. The methods view displays information about the business service, methods, and method arguments. The properties view displays information about the business service and properties. These views are described in detail below in conjunction with FIGS. 4-7.

Figure 4:
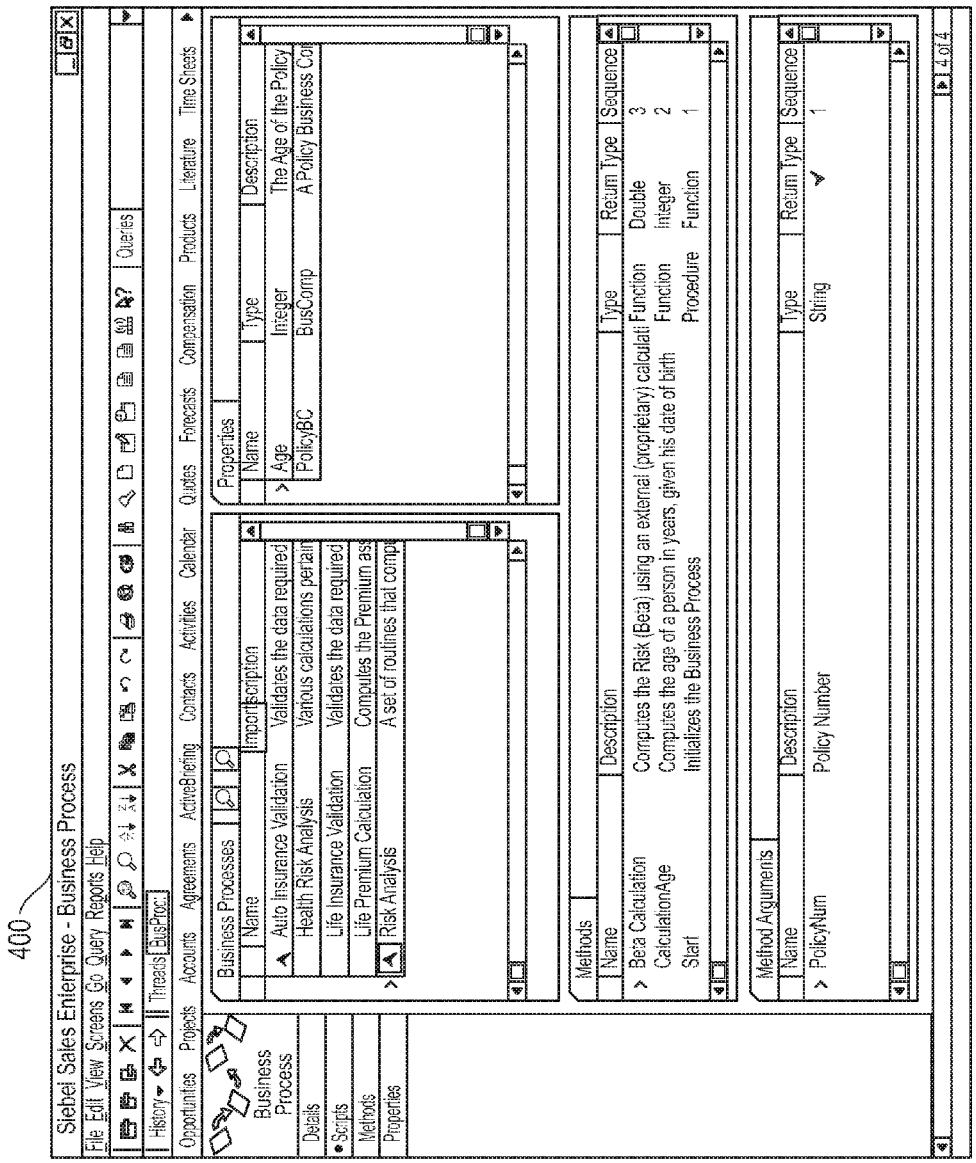
FIG. 4 depicts a details view according to an example embodiment of the present invention.

FIG. 4 depicts a details view 400 according to an example embodiment of the present invention. Details view 400 is intended to help an administrator view, categorize, and manage business services. Details view 400 displays the details about a business service including the methods, method arguments, and properties. It does not, however, display the scripts associated with each business service. A new business service can be created from this view 400, though methods and properties cannot. These are created through script editor 200.

Figure 5A:
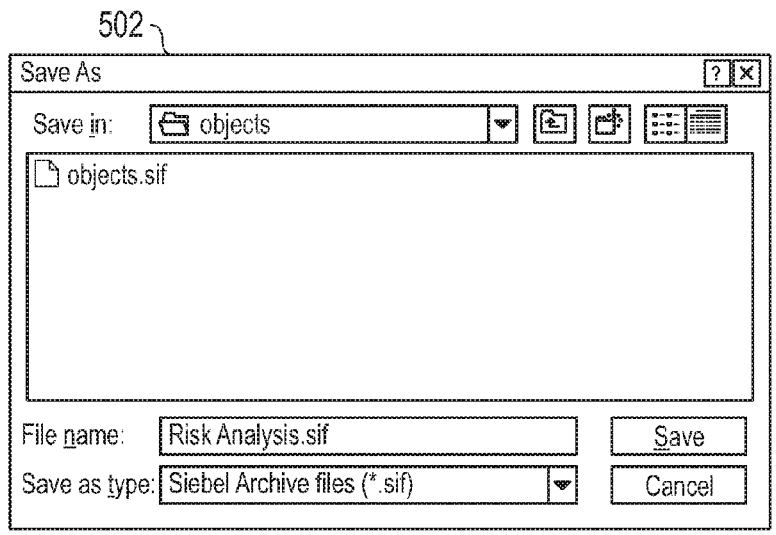
FIG. 5A depicts an example "Export Business Service" dialog.

One or more business services can be exported to an external file by selecting them in the business service list applet and clicking on the Export button in the business service list applet. This brings up an "Export Business Service" dialog 502, an example of which is depicted in FIG. 5A.

Figure 5B:
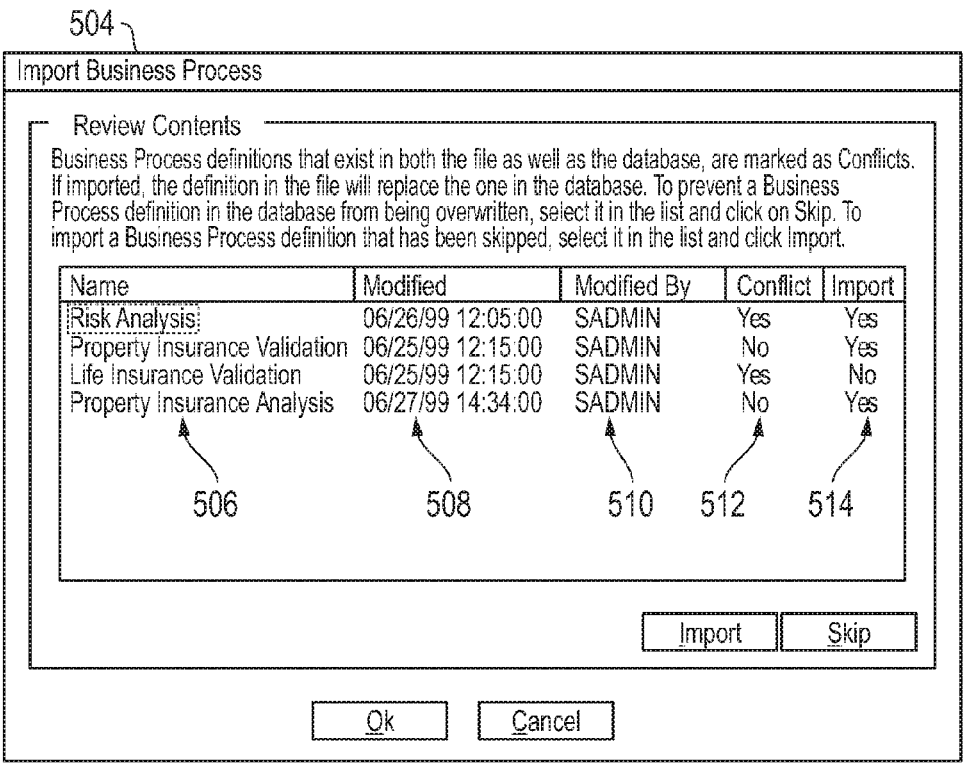
FIG. 5B depicts an example "Import Business Service" dialog.

Similarly, the contents of a business service that were exported earlier can be imported into the application database by clicking on the import button in the business service list applet. This brings up a "File Open" dialog that allows the administrator to specify the archive file to import from. Once the source archive file has been specified, the "Import Business Service" dialog 504 is brought up, an example of which is shown in FIG. 5B.

Dialog 504 lists all the business service definitions in the archive file. In this embodiment, other object types are not listed. The columns in dialog 504 are name 506, modified 508, modified by 510, conflict 512, and import 514. Name column 506 indicates the name of the business service. Modified column 508 indicates the date and time that this definition was last modified. Modified by column 510 indicates the person who last modified this definition. Conflict column 512 indicates whether the business service definition exists in both the file as well as database 170. Import column 514 indicates whether the business service definition is to be imported (Import="Yes") or skipped (Import="No"). The value of import column 514 can be modified by clicking on the "Import" and "Skip" buttons. Clicking on "Import" sets the value to "Yes" and clicking on "Skip" sets it to "No".

Clicking on OK causes all the business service definitions for which Import=Yes to be imported into database 170. In case of a conflict, the definition from database 170 (including methods and properties) is deleted and replaced by the definition in the file.

Figure 6:
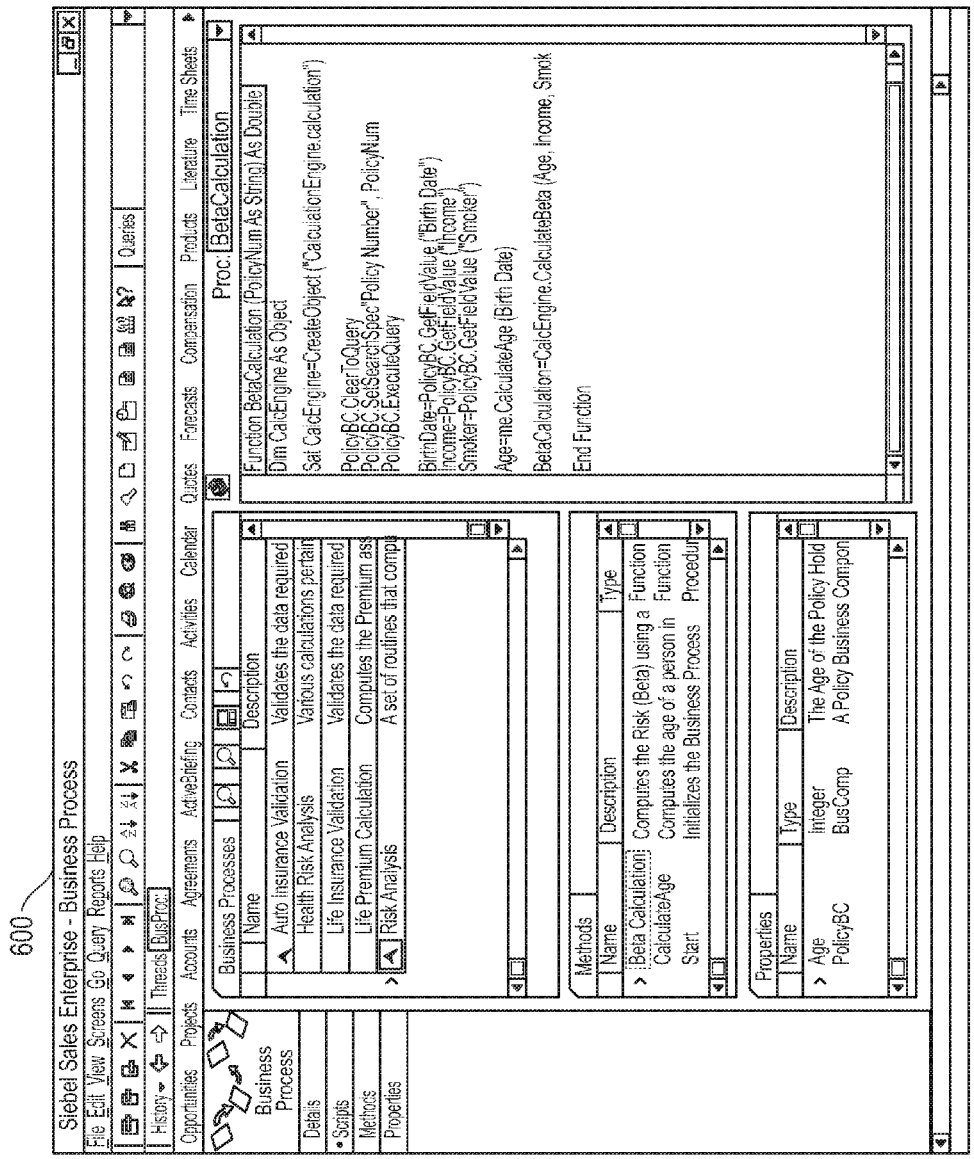
FIG. 6 depicts a scripts view according to an example embodiment of the present invention.

FIG. 6 depicts a scripts view 600 according to an example embodiment of the present invention. Scripts view 600 allows administrators to create and edit business service methods and properties through a built-in script editor, similar to the script editor described above. A new method can be created within scripts view 600 by selecting "(Add a Method)" from the method combo-box in the editor applet, and typing the code in the script editor. An existing method can be edited by selecting the existing method from the method combo-box or by selecting the business service method record in the method list applet and typing the code in the script editor.

The business service method record (i.e., name, type, return type, and script attribute) is created/updated when the administrator navigates to a different method via the method combo-box or by selecting a different record in the method list applet, selects a different business service in the business service list applet, or selects a property in the property list applet. However, the original definition of each modified method script is maintained in a temporary record. Saving changes to methods is discussed in greater detail below. The administrator can edit the description field for the method directly in the methods applet. The other attributes cannot be manually edited.

A new property can be created within scripts view 600 by selecting "Properties" from the method combo-box in the editor applet and typing the definition in the script editor. An existing property can be edited by selecting "Properties" from the method combo-box or by selecting the business service property record in the properties list applet and typing the code in the script editor. The business service property record is created/updated when the administrator navigates to a different property by selecting a different record in the properties list applet, changes the selection in the method combo-box, selects a different business service in the business service list applet, or selects a method in the method list applet. The name and data type attributes are automatically updated based on the information in the script editor. The other attributes cannot be manually edited. However, the original definition of each modified property is maintained in a temporary record. Saving changes to properties is discussed in greater detail below. Further, the administrator can edit the "Description & Required Field" for the property directly in the properties list applet.

Figure 7A:
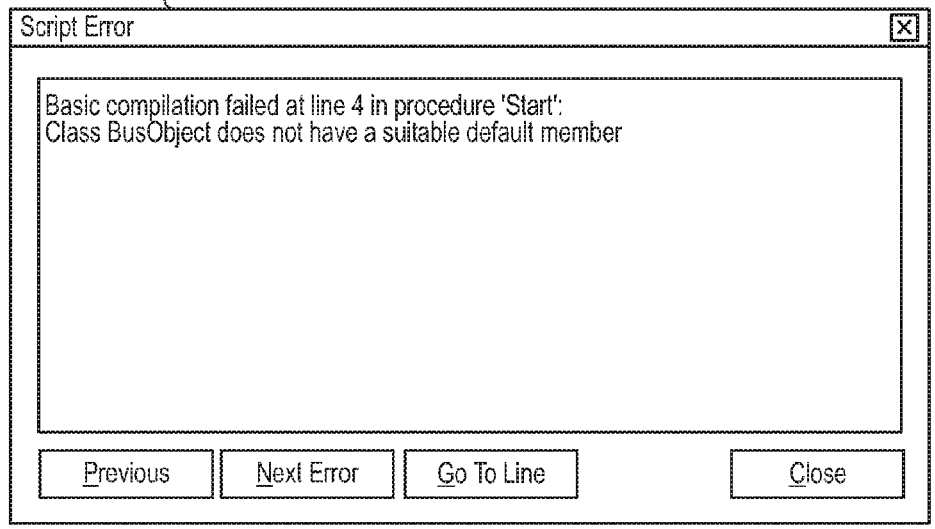
FIG. 7A depicts an example errors dialog.
Figure 7B:
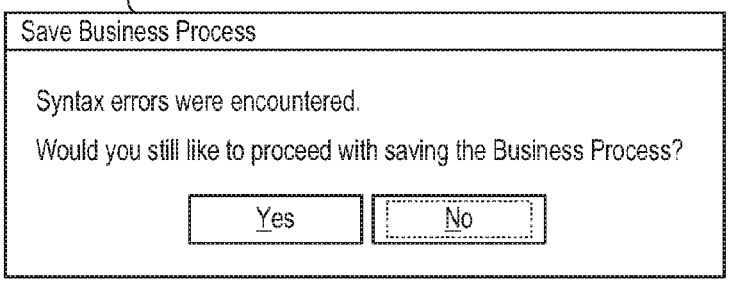
FIG. 7B depicts an example prompt.

If temporary records exist for any methods or properties associated with a business service, the "Unsaved Changes" flag of the business service is set to True and the "Save" & "Revert" buttons are enabled whenever that business service record is selected. In one embodiment, when the user explicitly clicks on the "Save" button in the business service list applet, a syntax check is performed on all the scripts associated with that business service, and any errors encountered are reported via the example errors dialog 702 depicted in FIG. 7A. If the user cancels the syntax checking by closing the errors dialog 700, the user is prompted: "Syntax errors were encountered. Would you still like to proceed with saving the business service?" An example of this prompt 704 is shown in FIG. 7B. If the user selects "Yes", the temporary records pertaining to the business service are deleted. If the user selects "No", the operation is cancelled and no records are deleted. The default is "No". If no errors are encountered, all temporary records pertaining to that business service are deleted.

Once the changes have been saved, the "Unsaved Changes" flag is set to "False" and the "Save" button is disabled. An "Undo" operation is available once the business service has been successfully saved. Undo causes the temporary records to be undeleted.

If the "Revert" button is clicked, the currently selected business service is restored to its previously saved state. The information from the temporary records is written to the corresponding record in the business service method, method argument, and property table. The temporary records for that business service are then deleted, the "Unsaved Changes" flag is set to False, the Save and Revert buttons are disabled for this business service, and the Undo operation is not available once the changes have been reverted.

Figure 8:
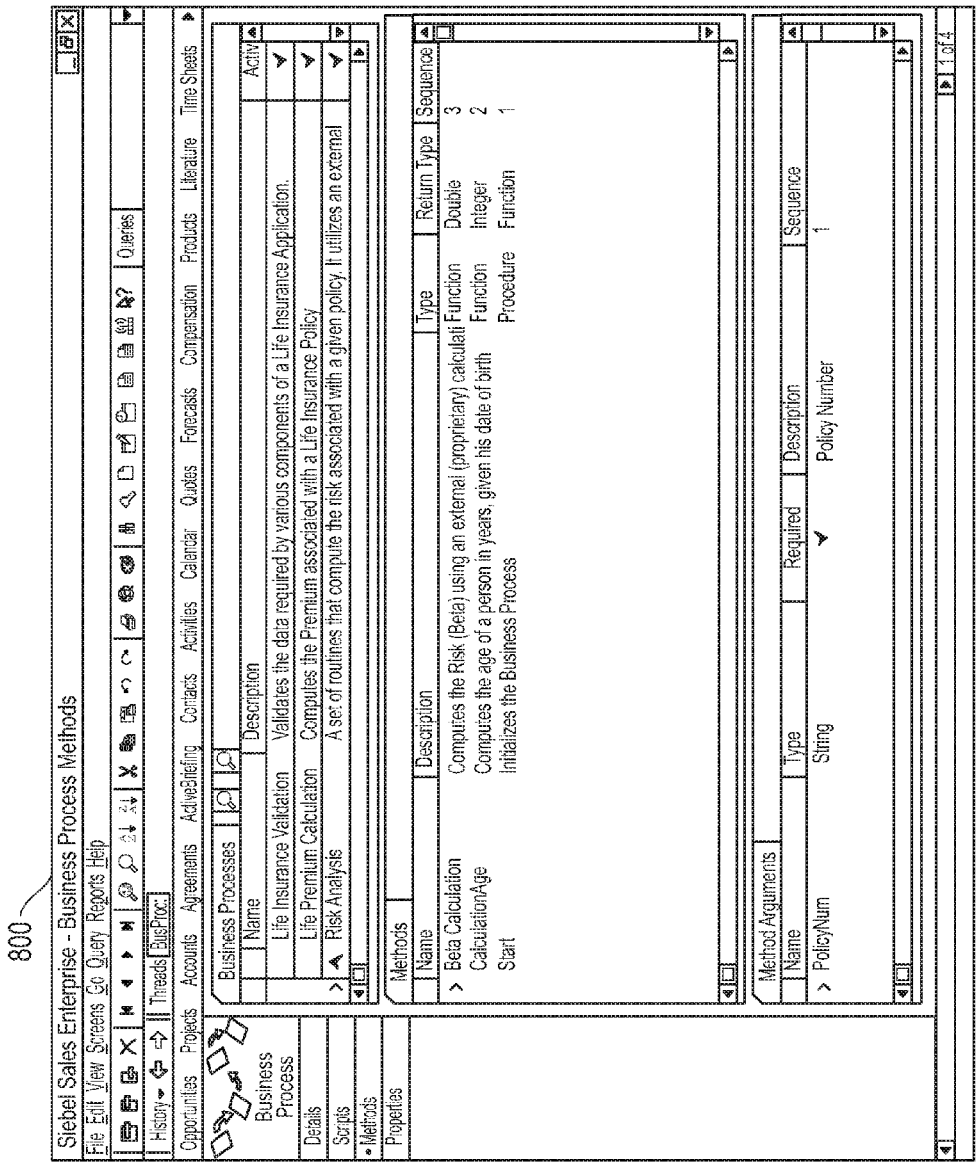
FIG. 8 depicts a methods view according to an example embodiment of the present invention.

FIG. 8 depicts a methods view 800 according to an example embodiment of the present invention. Methods view 800 displays information about the business service, methods, and method arguments. In one embodiment, a new business service can be created from methods view 800. However, the administrator can only edit the following fields from methods view 800: Business Service/Description, Business Service Method/Description, Business Service Method Argument/Description, Business Service Method Argument/Required.

Figure 9:
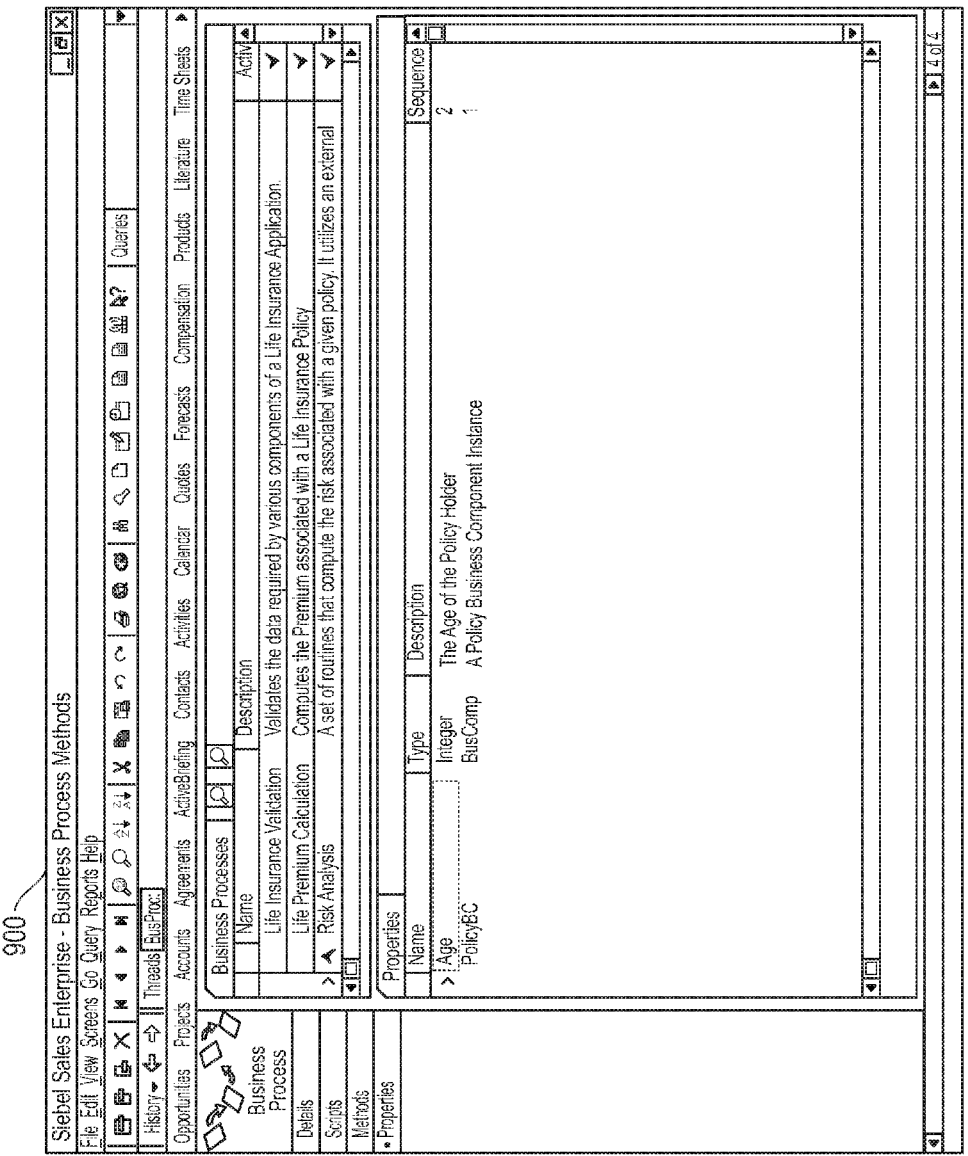
FIG. 9 depicts a properties view according to an example embodiment of the present invention.

FIG. 9 depicts a properties view 900 according to an example embodiment of the present invention. Properties view 900 displays information about the business service and its properties. In one embodiment, a new business service can be created from properties view 900. However, the administrator can only edit the following fields from this view: Business Service/Description and Business Service Property/Description.

Reports

User interface 110 has the capability of producing various reports. FIG. 10 depicts an example business service summary report 1000. Business service summary report 1000 includes summary information about the business services in the current query. This report accessible from all views in the business service screen. FIG. 11 depicts an example business service detail report 1100 that includes detail information about the business services in the current query. This report is also accessible from all views in the business service screen.

Property Sets

Figure 12:
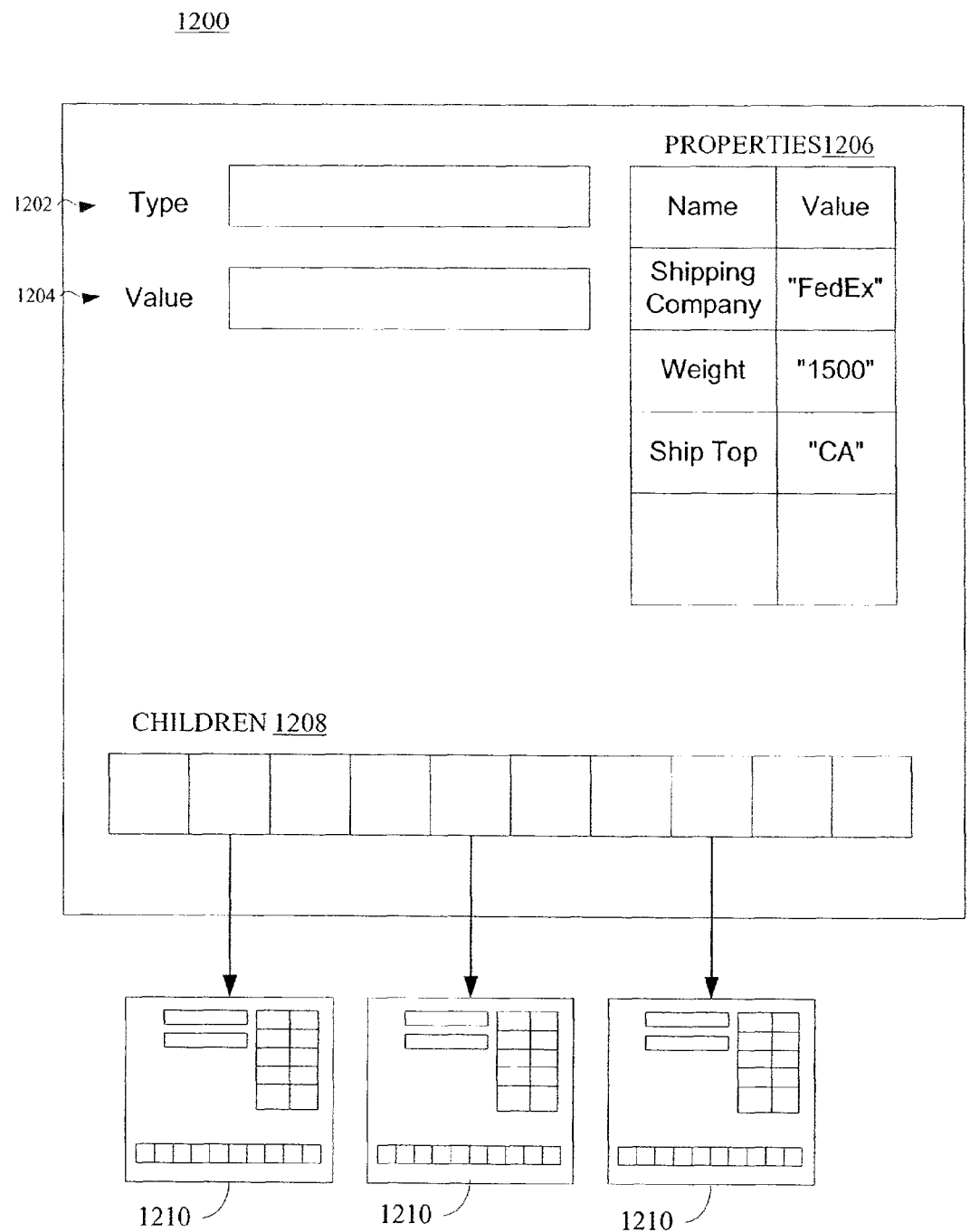
FIG. 12 depicts an example property set according to an example embodiment of the present invention.

Property sets are used internally to represent Siebel EAI data. A property set is a logical memory structure that is used to pass the data between business services. In one embodiment, property sets can include methods. FIG. 12 depicts an example property set 1200 according to an example embodiment of the present invention.

Property set 1200 includes four parts: a type field 1202, a value field 1204, a properties field 1206, and a children field 1208. Type field 1202 can be used to describe what type of object is being represented. Value field 1204 can be used to hold serialized data, such as a string of XML data. Properties field 1206 includes a table containing name-value pairs that can be used to represent column names and data, field names and data, or other types of name-value pairs. Children field 1208 includes an array of child-level property sets that can be used to represent instances of integration objects. For example, a result set might contain an account with some set of contact records from database 170. Each contact record is represented as a child property set 1210.

Example

Consider an example of a form on a corporate Web site. Many visitors during the day enter their personal data into the fields on the Web form. The field names represent arguments, whereas the personal data represent data. When the visitor clicks the Submit button on the form, the form's Common Gateway Interface (CGI) script formats and sends the data by way of the HyperText Transfer Protocol (HTTP) transport protocol to the corporate Web server. The CGI script can be written in JavaScript, Perl, or another scripting language.

The CGI script might have extracted the field names and created Extensible Markup Language (XML) elements from them to resemble the following XML tags:

```
First Name = <FirstName></FirstName>
Last Name = <LastName></LastName>
```

The CGI script might then have wrapped each data item inside the XML tags:

```
<FirstName>Hector</FirstName>
<LastName>Alacon</LastName>
```

To insert the preceding data into database 170 as a contact, a script could be written to call a business service that formats the XML input into a property set structure that the CRM application recognizes. The following is an example script:

```
x = TheApplication.InvokeMethod("WebForm", inputs, outputs);
var svc; // variable to contain the handle to the Service
var inputs; // variable to contain the XML input
var outputs; // variable to contain the output property set
svc = TheApplication( ).GetService("EAI XML Read from File");
    inputs = TheApplication( ).ReadEAIMsg("webform.xml");
    outputs = TheApplication( ).NewPropertySet( );
svc.InvokeMethod("MethodName°, inputs, outputs);
```

The following function could be called from the preceding code, where the function is attached to a business service:

```
Function Service__Preinvokemethod(MethodName, inputs, outputs)
{
    if (MethodName= ="GetwebContact")
    {
        frame = inputs.GetProperty("<First Name>");
        lname = inputs.GetProperty("<Last Name>");
        outputs.SetProperty("First Name", fname);
        outputs.SetProperty("Last Name", lname);
    return(CancelOperation);
    }
return(ContinueOperation);
}
```

In one embodiment, a business object is not allowed to be passed as an argument to a business service method.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The previous description of exemplary embodiments is provided to enable any person skilled in the art to make or use the present invention. While the invention has been particularly shown and described with reference to exemplary embodiments thereof, it will be understood by those skilled in the art that various changes in form and details may be made therein without departing from the spirit and scope of the invention.

What is claimed is:

1. A computer system comprising:
a processor, communicatively coupled to a non-transitory computer readable storage medium and configured to implement a customer relationship management (CRM) system configured to support a plurality of customers, wherein said CRM system comprises
a CRM application, and
a particular business service data object, wherein
said particular business service data object comprises at least one of
an internal business service data object that is defined within said CRM application, wherein the internal business service data object is compiled for distribution to an end user, or
an external business service data object that is defined in a database, wherein
the external business service data object is configured to be distributed to a disconnected user through a synchronization method, and
said particular business service data object is configured to
receive an invocation of a first operation from an external application via a standard object interface, and
perform said first operation on a first business object of a plurality of said business objects, using said processor, and
said external application is external to said CRM system and is configured to access said particular business service data object by initially searching a list of external business service data objects and, if said particular business service data object is not present in said list of external business service data objects, searching a list of internal business service data objects.

2. The system of claim 1, wherein
said plurality of said business objects comprises a business component, and
said business component comprises an encapsulation of said first business object.

3. The system of claim 1, wherein
said first business object maintains information about a state of a process executed by said particular business service data object, and
said plurality of said business objects defines rules for said particular business service data object.

4. The system of claim 1, further comprising:
a data exchange layer, wherein
said data exchange layer couples said CRM system and said database, and
said CRM system further comprises a data manager.

5. The system of claim 1, wherein
said particular business service data object is configured to be at least one of:
exported from said CRM application to an external file, or
imported into said CRM application.

6. The system of claim 1, wherein said standard object interface is configured according to a component object model (COM).

7. The system of claim 1, wherein said standard object interface is configured according to a common object request broker architecture (CORBA).

8. The system of claim 1, further comprising:
an object manager configured to manage a plurality of business objects, using said processor, wherein
said object manager comprises said plurality of said business objects,
said object manager comprises said particular business service data object, and
said object manager is configured to manage said particular business service data object.

9. The system of claim 8, wherein
said CRM system comprises a user interface and a data manager, and
said object manager provides an interface between said user interface and said data manager.

10. The system of claim 8, wherein
said object manager operates independently of data structures or tables in which data is stored in said database,
said object manager operates independently by virtue of said object manager communicating with a data manager, said data manager is comprised in said CRM system,
said data manager maintain a logical view of said data in said database,
said data manager is configured to provide database query functions to access said data, and
said data manager operates on object definitions that define a database schema by said database.

11. The system of claim 8, wherein
said object manager is configured to manage one or more sets of rules associated with one or more applications, and
said plurality of said business objects comprise representations of said one or more sets of rules associated with said one or more applications.

12. The system of claim 1, wherein
each business object of said plurality of said business objects is associated with a specific data set, and
said particular business service data object operates independently of data sets by virtue of said particular business service data object operating on one or more of said plurality of said business objects.

13. The system of claim 1, further comprising:
a mobile client, wherein
said mobile client is configured to
download a subset of data from said database,
update at least a portion of said subset of said data, and
communicate with said database to synchronize said subset of said data with said database after the update.

14. The system of claim 1, wherein
said particular business service data object comprises a method, and
said method defines one or more rules for responding to a condition.

15. The system of claim 5, wherein
said CRM application is further configured to perform conflict resolution, in the event that said particular business service data object is imported into said CRM application.

16. The system of claim 1, wherein
one or more property sets are used to represent data stored in said database,
each of said one or more property sets comprises a logical structure used to pass at least a portion of said data to said particular business service data object, and
said one or more property sets include a method.

17. The computer system of claim 1, wherein
said computer system further comprises:
a non-transitory computer-readable storage medium,
a database configured to be used by a business to store information regarding a plurality of customers of said business, wherein
said database is stored in said non-transitory computer-readable storage medium;
said CRM system further comprises:
an object manager configured to manage a plurality of business objects, using said processor, wherein
said object manager comprises said plurality of said business objects, and
said object manager comprises said particular business service data object, and
said particular business service data object implements a standard object interface; and
said particular business service is further configured to:
receive a second operation from the external application via the standard object interface,
perform said second operation on a second business object of said plurality of said business objects, using said processor, wherein
said first operation is independent of said second operation, and
said first business object is independent of said second business objection.

18. The computer system of claim 1, wherein
said CRM application is configured to communicate with the internal business service data object, and
the external business service data object.

19. A method in a computer system comprising:
receiving an invocation of a first operation from an external application wherein
a particular business service data object is comprised in a customer relationship management (CRM) system and comprises at least one of
an internal business service data object that is defined within a CRM application, wherein
the internal business service data object is compiled for distribution to an end user, or
an external business service data object that is defined in a database that is communicatively coupled to said CRM system accessing said particular business service, wherein
the external business service data object is configured to be distributed to a disconnected user through a synchronization method; and
said external application is configured to access said particular business service data object by initially searching a list of external business service data objects and, if said particular business service data object is not present in said list of external business service data objects, searching a list of internal business service data objects; and
performing said first operation on a first business object of a plurality of business objects, using a processor of said computer system.

20. The method of claim 19, wherein
said plurality of said business objects comprises a business component, and
said business component comprises an encapsulation of said first business object.

21. The method of claim 19, further comprising:
maintaining information about a state of a process executed by said particular business service data object, wherein
said maintaining is performed by said first business object.

22. The method of claim 19, further comprising:
defining rules for said particular business service data object, wherein
said defining is performed by said plurality of said business objects.

23. The method of claim 19, further comprising at least one of:
exporting said particular business service data object from said CRM application to an external file, or
importing said particular business service data object into said CRM application.

24. The method of claim 19, wherein
said plurality of said business objects is configured to invoke said particular business service data object,
said first business object comprises
a method, and
a property,
said method and said property are child objects of said particular business service data object, and said first business object comprises
an encapsulation of a portion of data.

25. The method of claim 19, wherein said standard object interface is configured according to a component object model (COM).

26. The method of claim 19, wherein said standard object interface is configured according to a common object request broker architecture (CORBA).

27. The method of claim 19, wherein
the receiving the invocation of the first operation further comprises:
receiving an invocation of a second operation from the external application,
receiving the invocation of the first operation and receiving the invocation of the second operation via a standard object interface, wherein
said standard object interface is configured to be implemented by the particular business service data object,
said database is stored in a non-transitory computer readable storage medium of said computer system,
said CRM system is configured to support a plurality of customers of a business, and
said external application is external to said CRM system; and
said performing said first operation on said first business object further comprises:
said plurality of said business objects are configured to be managed by an object manager,
said object manager is comprised in said CRM system,
said object manager comprises said plurality of said business objects, and
said object manager comprises said particular business service data object; and
performing said second operation on a second business object of said plurality of said business objects, using said processor, wherein
said first operation is independent of said second operation, and
said first business object is independent of said second business object.

28. A computer program product comprising instructions executable to:
receive an invocation of a first operation from an external application, wherein
a particular business service data object is comprised in a customer relationship management (CRM) system and comprises at least one of
an internal business service data object that is defined within a CRM application, wherein
the internal business service data object is compiled for distribution to an end user, or
an external business service data object that is defined in a database that is communicatively coupled to said CRM system, wherein
the external business service data object is configured to be distributed to a disconnected user through a synchronization method;
access said particular business service data object by initially searching a list of external business service data objects and, if said particular business service data object is not present in said list of external business service data objects, searching a list of internal business service data objects; and
perform said first operation on a first business object of a plurality of business objects, using a processor of said CRM system.

29. The computer program product of claim 28, wherein
said plurality of said business objects comprises a business component, and
said business component comprises an encapsulation of said first business object.

30. The computer program product of claim 28, further comprising instructions executable to:
maintain information about a state of a process executed by said particular business service data object.

31. The computer program product of claim 28, further comprising instructions executable to:
define rules for said particular business service data object.

32. The computer program product of claim 28, further comprising instructions executable to perform at least one of:
export said particular business service data object from said CRM application to an external file, or
import said particular business service data object into said CRM application.

33. The computer program product of claim 28, wherein
said plurality of said business objects is configured to invoke said particular business service data object,
said first business object comprises
a method, and
a property,
said method and said property are child objects of said particular business service data object, and
said first business object comprises
an encapsulation of a portion of data.

34. The computer program product of claim 28, wherein said standard object interface is configured according to a component object model (COM).

35. The computer program product of claim 28, wherein said standard object interface is configured according to a common object request broker architecture (CORBA).

36. The computer program product of claim 28, wherein the instructions are further executable to:
receive the invocation of the first operation and receive an invocation of a second operation from the external application via the standard object interface, wherein
said standard object interface is configured to be implemented by the particular business service data object,
said database is stored in a non-transitory computer readable storage medium of said computer system,
said CRM system is configured to support a plurality of customers of a business, and
said external application is external to said CRM system; and
perform said first operation on said first business object, wherein
said plurality of said business objects are configured to be managed by an object manager,
said object manager is comprised in said CRM system,
said object manager comprises said plurality of said business objects, and
said object manager comprises said particular business service data object; and
perform said second operation on a second business object of said plurality of said business objects, using said processor, wherein
said first operation is independent of said second operation, and
said first business object is independent of said second business object.

* * * * *